US008939328B2

(12) United States Patent
Velgersdyk et al.

(10) Patent No.: US 8,939,328 B2
(45) Date of Patent: Jan. 27, 2015

(54) CLEANING FLUID CARTRIDGE

(75) Inventors: Jeffrey N. Velgersdyk, Minneapolis, MN (US); Douglas S. Ryder, St. Michael, MN (US); Joseph E. Tix, Hastings, MN (US); Mark T Weinberger, Mounds View, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 7 days.

(21) Appl. No.: 12/991,077

(22) PCT Filed: Apr. 30, 2009

(86) PCT No.: PCT/US2009/042218
§ 371 (c)(1),
(2), (4) Date: Nov. 4, 2010

(87) PCT Pub. No.: WO2009/137314
PCT Pub. Date: Nov. 12, 2009

(65) Prior Publication Data

US 2011/0056995 A1 Mar. 10, 2011

Related U.S. Application Data

(60) Provisional application No. 61/050,799, filed on May 6, 2008, provisional application No. 61/047,482, filed on Apr. 24, 2008, provisional application No. 60/971,305, filed on Sep. 11, 2007.

(51) Int. Cl.

| | |
|---|---|
| ***B65D 88/54*** | (2006.01) |
| ***G01F 11/00*** | (2006.01) |
| ***B67D 7/60*** | (2010.01) |
| ***B67D 1/08*** | (2006.01) |
| ***F42B 5/24*** | (2006.01) |
| ***B05B 15/02*** | (2006.01) |
| ***B08B 9/00*** | (2006.01) |
| ***B08B 9/027*** | (2006.01) |

(52) U.S. Cl.
CPC ................ *F42B 5/24* (2013.01); *B05B 15/025* (2013.01); *B08B 9/00* (2013.01); *B08B 9/027* (2013.01)
USPC ............................ 222/326; 333/148; 333/389

(58) Field of Classification Search
USPC .......... 222/81–83.5, 148, 325–327, 386, 387, 222/389; 239/106, 112, 113
See application file for complete search history.

(56) References Cited

U.S. PATENT DOCUMENTS 1,040,513 A * 10/1912 Colson .......................... 222/389
1,816,555 A 7/1931 Ward
2,818,999 A * 1/1958 Miller .......................... 222/323
3,136,456 A * 6/1964 Sherbondy .................... 222/327
3,169,545 A 2/1965 Kolling
3,255,972 A 6/1966 Hultgren et al.
4,174,068 A 11/1979 Rudolph (Continued)

OTHER PUBLICATIONS

"fast" Merriam-Webster.com Merriam-Webster, Jun. 9, 2014.*

(Continued)

*Primary Examiner* — J. Casimer Jacyna
*Assistant Examiner* — Benjamin R Shaw
(74) *Attorney, Agent, or Firm* — Kinney & Lange, P.A.

(57) ABSTRACT

The cartridge 10 provides an inexpensive, effective, clean, reliable means of supplying pressurized cleaning fluid for two component applicators 14. The low friction piston 18 design reduces drag and provides consistent cleaning fluid 12 pressure.

5 Claims, 3 Drawing Sheets

(56) References Cited

U.S. PATENT DOCUMENTS

| | | | | |
|---|---|---|---|---|
| 4,282,813 | A | 8/1981 | Sterbutzel | |
| 4,549,676 | A | 10/1985 | Gerich | |
| 4,583,665 | A * | 4/1986 | Barriac | 222/83 |
| 4,791,946 | A | 12/1988 | Cavanaugh et al. | |
| 4,814,794 | A | 3/1989 | Sato | |
| 4,859,121 | A * | 8/1989 | Deysson et al. | 406/114 |
| 4,878,619 | A | 11/1989 | Norman | |
| 4,969,603 | A | 11/1990 | Norman | |
| 5,188,259 | A | 2/1993 | Petit | |
| 5,666,690 | A | 9/1997 | Domansky | |
| 5,754,197 | A | 5/1998 | Shibata | |
| 5,934,520 | A | 8/1999 | Byerly et al. | |
| 6,179,217 | B1 * | 1/2001 | Yoshida et al. | 239/7 |
| 6,284,072 | B1 | 9/2001 | Ryan et al. | |
| 6,488,216 | B1 | 12/2002 | Lewis | |
| 6,533,187 | B2 | 3/2003 | May | |
| 6,628,908 | B2 * | 9/2003 | Matsumoto et al. | 399/106 |
| 6,742,722 | B2 * | 6/2004 | Hosoda et al. | 239/305 |
| 6,996,956 | B2 | 2/2006 | Sperry et al. | |
| 7,275,663 | B2 * | 10/2007 | Campbell et al. | 222/389 |
| 2005/0189435 | A1 * | 9/2005 | Kubota et al. | 239/223 |
| 2007/0181599 | A1 * | 8/2007 | Kosmyna et al. | 222/95 |

OTHER PUBLICATIONS

Graco/Gusmer DGun manual, outlining prior method of cleaning a fast-setting materials gun on p. 18.

Graco Fusion Manual, which references a "solvent purge assembly" on p. 16 and other maintenance procedures on pp. 22-24.

* cited by examiner

CLEANING FLUID CARTRIDGE

This application claims the benefit of U.S. Application Ser. No. 60/971,305 filed Sep. 11, 2007, U.S. Application Ser. No. 61/047,482, filed Apr. 24, 2008, and U.S. Application Ser. No. 61/050,799, filed May 6, 2008 and the contents of which are hereby incorporated by reference.

TECHNICAL FIELD

Background Art

Spray guns for fast setting materials such as polyurethane foams have traditionally presented a difficulty in keeping them clean and spraying properly. Often, the gun is cleaned by partially disassembling it and washing the wetted parts on the solvent. Graco's FUSIONS spray gun utilizes a zerk fitting which allows grease to be injected into the wetted area at the end of the day to keep the material from hardening therein.

DISCLOSURE OF THE INVENTION

A cartridge to contain cleaning fluid is designed to be removably fitted to the spray gun. The cartridge is constructed of 1) a cylindrical housing, 2) a piston, 3) a tabbed plug, 4) a cap, and 5) several o-rings. The cylindrical housing has a smooth bore for low friction piston travel, threads at the top for the cap, a small radial hole near the bottom to allow pressurized air into the cartridge below the piston, external o-rings at the top that, when inserted into the handle, separate the pressurized air and cleaning liquid, and an external o-ring at the bottom that, when inserted, seals the pressurized air in the handle. The piston has two low friction material external o-rings that fit into grooves designed for minimal o-ring squeeze and also has locking fingers that snap into place when the piston reaches its travel limit to discourage refilling of the cartridge. The plug is bonded to the bottom of the housing to form a hermetic seal, but also contains an optional redundant o-ring seal that fits between the plug and housing in case of primary bond failure. The plug has a large tab for easy gripping and ears that, when inserted into the handle of the applicator and rotated 90 degrees, lock the cartridge in place when pressurized. An aluminum foil induction inner seal cap is assembled onto the cartridge after filling to seal in the cleaning liquid. The foil seal on the cartridge, when inserted, is punctured with a small sharp pin in the handle of the applicator. The puncture is large enough to allow the cleaning fluid, when pressurized, to flow into the applicator, but small enough to restrict flow, when depressurized, preventing inadvertent leakage when taken out of the handle.

In the handle of the applicator, pressurized air blankets the midsection of the cartridge and flows through the small radial hole in the housing where it pushes on the bottom of the piston, which in turn pushes on and pressurizes the cleaning fluid above the piston, causing it to flow through the punctured foil seal and into the applicator.

The cartridge components may be constructed from a wide array of engineering materials, but for the sake of cost, the preferred construction is plastic injection molded components. The preferred methods of bonding the plug to the housing are spin welding, sonic welding, or adhesive bonding, but it is also possible to mechanically connect them, using only the plug's o-ring to form the seal.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
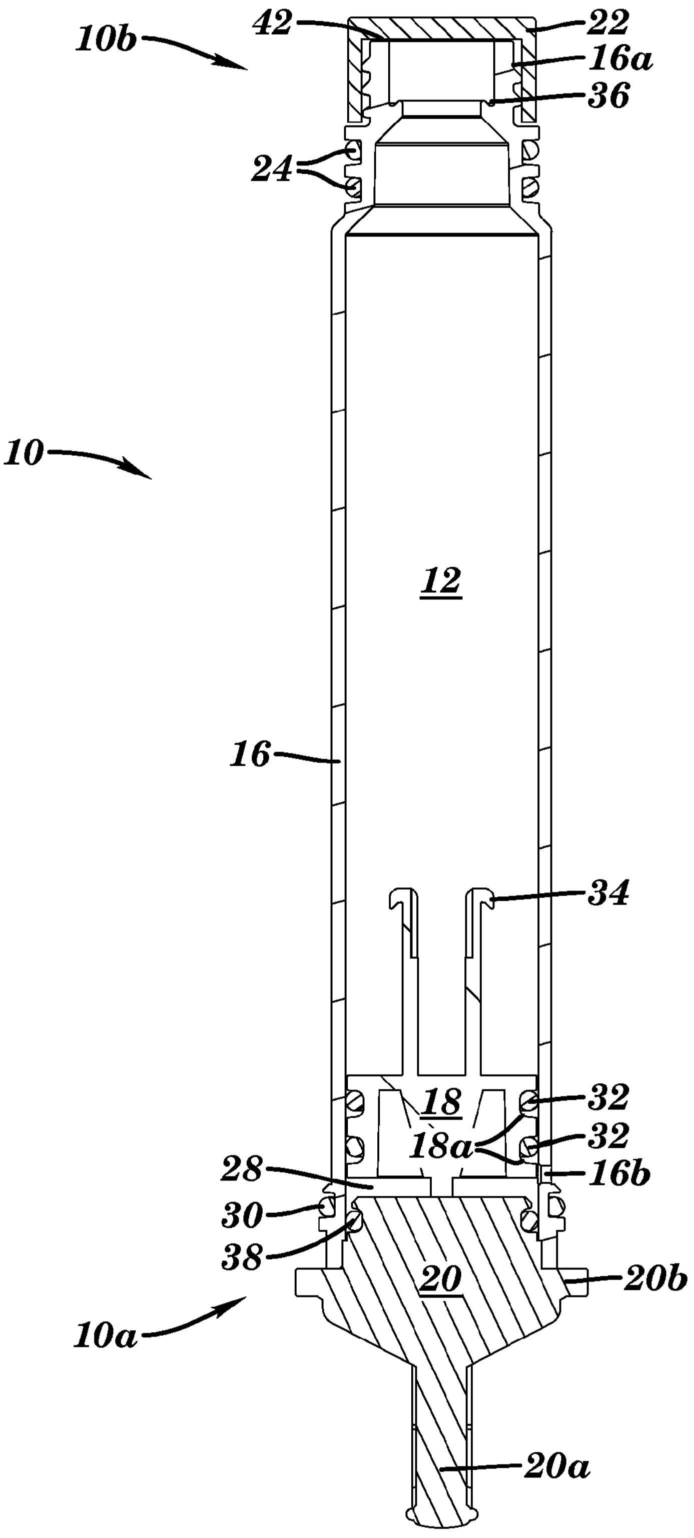
FIG. 1 shows a cross-section of the cartridge of the instant invention.
Figure 2:
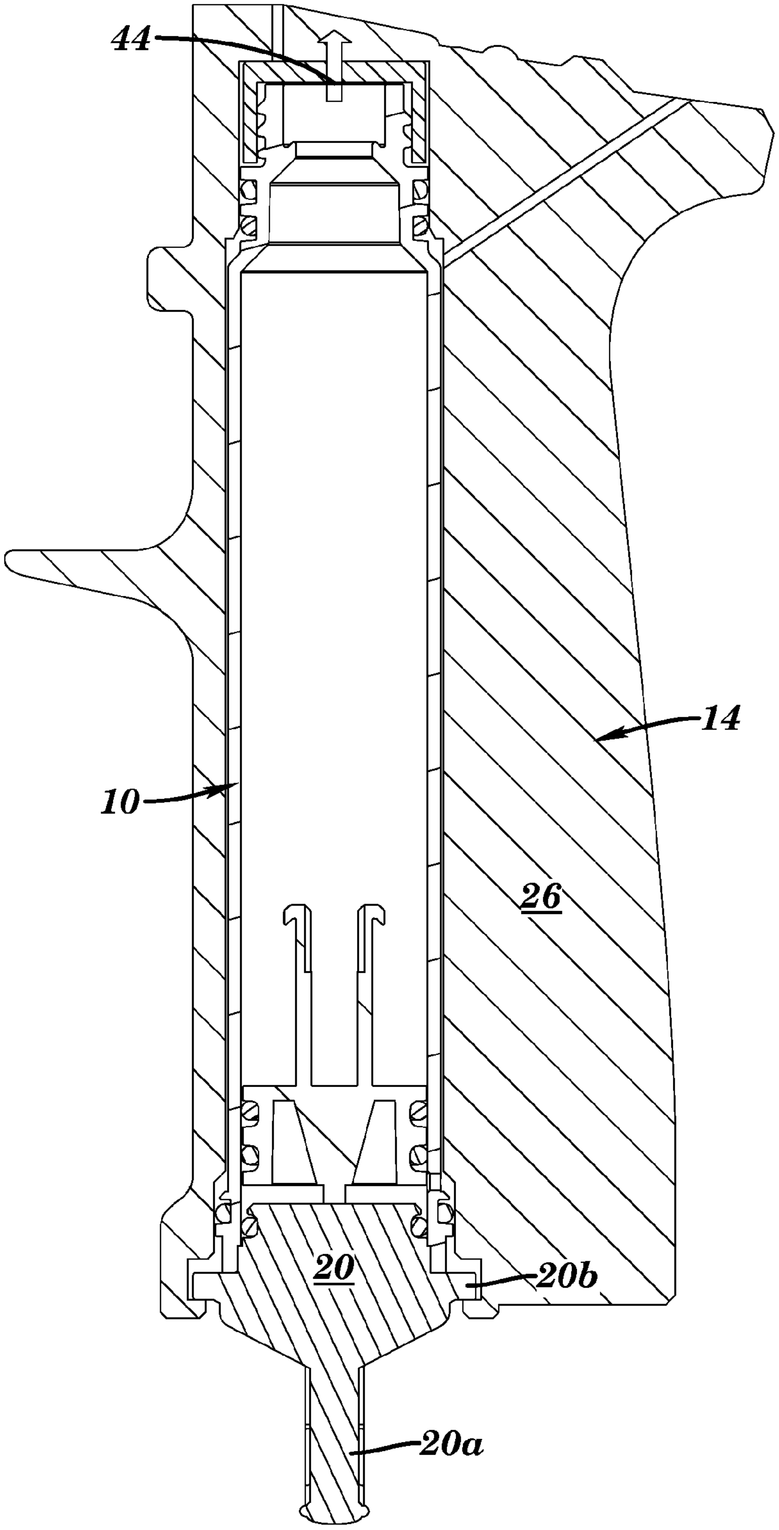
FIG. 2 shows a cross-section of the cartridge of the instant invention in the handle of a two component applicator.
Figure 3:
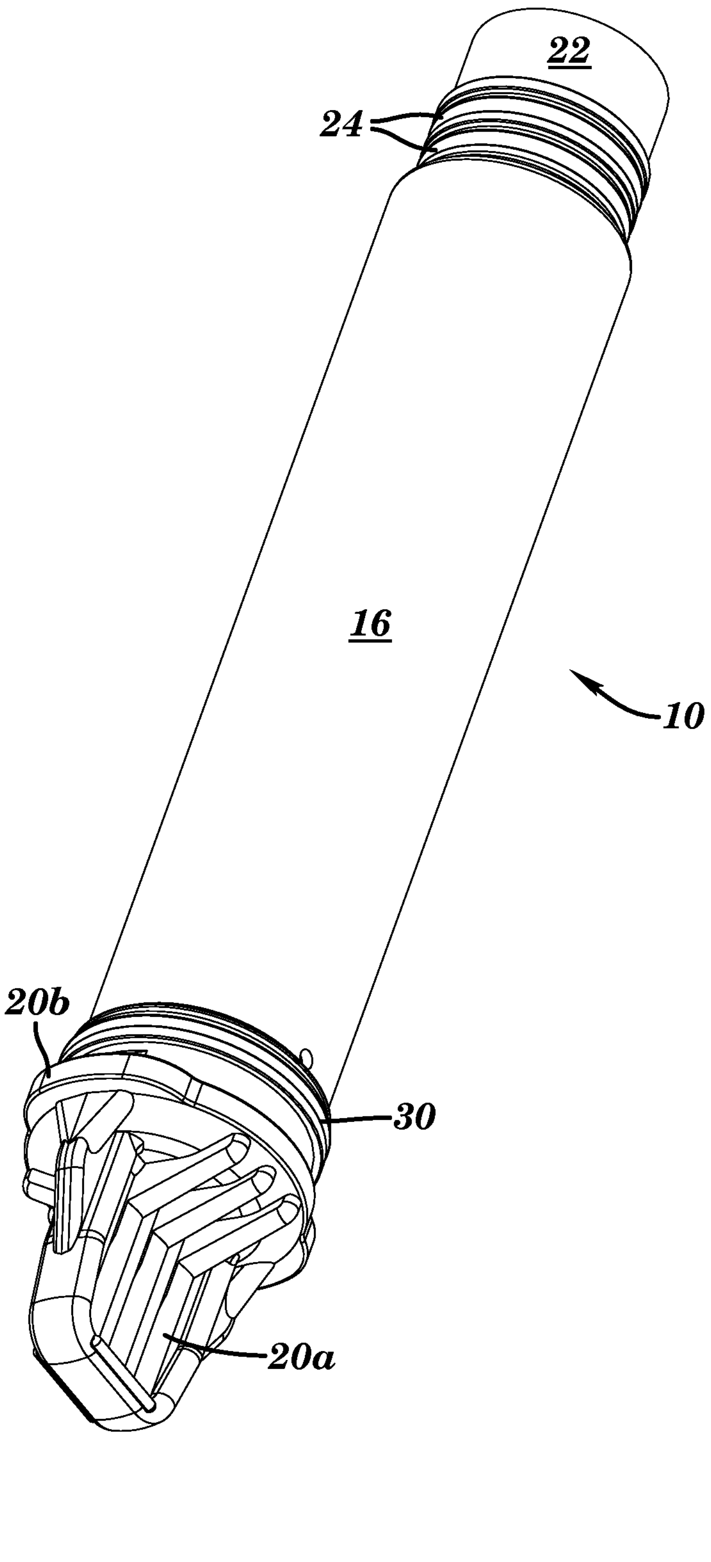
FIG. 3 shows an external view of the cartridge of the instant invention.

A cartridge 10 to contain cleaning fluid 12 is designed to be removably fitted to the spray gun 14. The cartridge 10 is constructed of a cylindrical housing 16, a piston 18, a tabbed plug 20, a cap 22 and several o-rings. The cylindrical housing 16 has a smooth bore for low friction piston travel, threads 16*a* at the top for the cap 22, a small radial hole 16*b* near the bottom 10*a* to allow pressurized air into the cartridge 10 below the piston 18, external o-rings 24 at the top 10*b* that, when inserted into the handle 26 of spray gun 14, separate the pressurized air 28 and cleaning liquid 12, and an external o-ring 30 at the bottom 10*a* that, when inserted, seals the pressurized air in the handle 26. The piston 18 has two low friction material external o-rings 32 that fit into grooves 18*a* designed for minimal o-ring squeeze and also has locking fingers 34 that snap into place on lips 36 when the piston 18 reaches its travel limit to discourage refilling of the cartridge 10.

The plug 20 is bonded to the bottom of the housing 16 to form a hermetic seal, but also contains an optional redundant o-ring seal 38 that fits between the plug 20 and housing 16 in case of primary bond failure. The plug 20 has a large tab 20*a* for easy gripping and ears 20*b* that, when inserted into the handle 26 of the applicator 14 and rotated 90 degrees, lock the cartridge 10 in place when pressurized.

An aluminum foil induction inner seal cap 42 is assembled onto the cartridge 10 after filling to seal in the cleaning liquid 12. The foil seal 42 on the cartridge, when inserted, is punctured with a small sharp pin 44 in the handle 26 of the applicator 14. The puncture is large enough to allow the cleaning fluid 12, when pressurized, to flow into the applicator 14, but small enough to restrict flow when depressurized, preventing inadvertent leakage when taken out of the handle 26.

In the handle 26 of the applicator 14, pressurized air blankets the midsection of the cartridge 10 and flows through the small radial hole 16*b* in the housing 16 where it pushes on the bottom of the piston 18, which in turn pushes on and pressurizes the cleaning fluid 12 above the piston 18, causing it to flow through the punctured foil seal 42 and into the applicator 14.

The cartridge components may be constructed from a wide array of engineering materials, but for the sake of cost, the preferred construction is plastic injection molded components. The preferred methods of bonding the plug to the housing are spin welding, sonic welding, or adhesive bonding, but it is also possible to mechanically connect them, using only the plug's o-ring 38 to form the seal.

It is contemplated that various changes and modifications may be made to the cartridge without departing from the spirit and scope of the invention as defined by the following claims.

The invention claimed is:

1. A cleaning fluid cartridge configured to be insertable into a handle of a material applicator, the cleaning fluid cartridge comprising:

a cylindrical housing having an exterior, an interior bore, a top end, and a bottom end;

a piston located in the interior bore of the cylindrical housing intermediate the top and bottom ends, the piston being free of connection to structure outside of the cylindrical housing;

a radial hole extending through the housing from the exterior to the interior bore, the radial hole located between the piston and the bottom end of the housing for transmitting pressurized air supplied from the material applicator into the interior bore below the piston when the cleaning fluid cartridge is positioned in the handle of the material applicator;

at least one upper o-ring seal located on the exterior of the housing adjacent the top end of the housing for engaging the handle when the cleaning fluid cartridge is positioned in the handle of the material applicator;

at least one lower o-ring seal located on the exterior of the housing between the radial hole and the bottom end of the housing for engaging the handle when the cleaning fluid cartridge is positioned in the handle of the material applicator;

a cleaning fluid suited to dissolving plural component materials dispensed by the material applicator, the cleaning fluid being located between the piston and the top end; and a plug in the housing bottom end and sealed to the cylindrical housing, the plug having a grippable tab extending downward and having ears extending radially outward for engaging the material applicator and locking the cleaning fluid cartridge in the handle.

2. The cleaning fluid cartridge of claim 1 further comprising first and second o-ring seals located on an exterior of the piston and providing low friction sealing between the piston and the cylindrical housing.

3. The cleaning fluid cartridge of claim 1 further comprising an o-ring between the plug and the cylindrical housing.

4. The cleaning fluid cartridge of claim 1 further comprising a cap removably threadedly attached to the cylindrical housing top end.

5. The cleaning fluid cartridge of claim 1 further comprising a foil seal on the cylindrical housing top end.

* * * * *

UNITED STATES PATENT AND TRADEMARK OFFICE

CERTIFICATE OF CORRECTION

PATENT NO. : 8,939,328 B2
APPLICATION NO. : 12/991077
DATED : January 27, 2015
INVENTOR(S) : Jeffrey N. Velgersdyk et al.

It is certified that error appears in the above-identified patent and that said Letters Patent is hereby corrected as shown below:

In the Specification

Col. 1, Line 17
Delete "FUSIONS"
Insert --Fusion®--

Signed and Sealed this
Twenty-second Day of September, 2015

Michelle K. Lee
*Director of the United States Patent and Trademark Office*